United States Patent
Bell, Jr. et al.

(10) Patent No.: US 7,543,109 B1
(45) Date of Patent: Jun. 2, 2009

(54) SYSTEM AND METHOD FOR CACHING DATA IN A BLADE SERVER COMPLEX

(75) Inventors: Robert H. Bell, Jr., Austin, TX (US);
Jose R. Escalera, Austin, TX (US);
Octavian F. Herescu, Austin, TX (US);
Vernon W. Miller, Tucson, AZ (US);
Michael D. Roll, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/122,448

(22) Filed: May 16, 2008

(51) Int. Cl.
*G06F 12/02* (2006.01)

(52) U.S. Cl. ............... 711/113; 711/133; 711/136; 711/159; 711/160; 712/217

(58) Field of Classification Search ............. None
See application file for complete search history.

(56) References Cited

U.S. PATENT DOCUMENTS

| | | | |
|---|---|---|---|
| 5,829,025 A | 10/1998 | Mittal | |
| 6,886,085 B1 | 4/2005 | Shuf et al. | |
| 2003/0014603 A1* | 1/2003 | Sasaki et al. | 711/158 |
| 2004/0083341 A1* | 4/2004 | Robinson et al. | 711/133 |
| 2004/0215746 A1 | 10/2004 | McCanne et al. | |
| 2005/0120160 A1 | 6/2005 | Plouffe et al. | |
| 2007/0079073 A1 | 4/2007 | Rosenbluth et al. | |
| 2007/0136532 A1 | 6/2007 | Irish et al. | |

* cited by examiner

*Primary Examiner*—Kevin L Ellis
*Assistant Examiner*—Alan M Otto
(74) *Attorney, Agent, or Firm*—King & Spalding LLP

(57) ABSTRACT

A method for caching data in a blade computing complex includes providing a storage blade that includes a disk operative to store pages of data and a cache memory operative to store at least one of the pages. A processor blade is provided that includes a first memory area to store at least one of the pages and a second memory area configured to store an address of each of the pages and a hint value that is assigned to each of the pages. An address of each of the pages is stored in the second memory area, and a hint is assigned to each of the pages, where the hint is one of: likely to be accessed, may be accessed, and unlikely to be accessed. The page is then stored in storage blade cache memory based on the hint.

1 Claim, 5 Drawing Sheets

| Cases and categories: | Replacing LRU on page fault 202 | | | Page is Pinned 204 | | | All other cases 206 | | |
|---|---|---|---|---|---|---|---|---|---|
| Hint | low | mid | high | low | mid | high | low | mid | high |
| Likely | | | v | | | | | | |
| Possible Likely | | v | | | | | | v | |
| Unlikely | v | | | v | v | v | v | | v |

FIG. 2

| CSPT Entries | TLB Entries | | | |
|---|---|---|---|---|
| Last hint sent to blade storage | Page Access Counts (MRU counts) | Page Pinned? | Is LRU? | Other TLB info |
| Possible Likely | 3092077 | N | N | ... |
| Unlikely | 2343456898 | N | N | ... |
| Unlikely | 121 | N | Y | ... |
| Unlikely | 662171 | Y | N | ... |

FIG. 3

SYSTEM AND METHOD FOR CACHING DATA IN A BLADE SERVER COMPLEX

BACKGROUND OF THE INVENTION

1. Field of the Invention

This invention relates to methods and mechanisms for caching data in a blade server complex to reduce the likelihood that data will be unnecessarily cached.

2. Description of Background

"Blade" systems have gained widespread prominence and acceptance in server environments. A conventional Blade system may consist of one or more Processor Blades, and/or one or more Storage Blades. Conventional Processor Blades may not include high-capacity disk-type storage. Instead, conventional Processor Blades rely on Storage Blades to provide high-capacity storage. Both Processor Blades and Storage Blades include memory that is used to store "pages" of data that may contain information that may be accessed by a user of the Blade system. This memory is conventionally referred to as cache memory on the Storage Blade and main memory on the Processor Blade. Conventionally, as pages are loaded from disc storage on a Storage Blade, the pages are stored in cache memory. The Processor Blade may then access the page in the cache memory and move it to main memory, from which it may then be accessed by users of the Blade system.

In a Blade complex that includes at least one Processor Blade and at least one Storage Blade, pages are often cached in both the Processor Blade memory and the Storage Blade cache. This page duplication in both the processor memory and storage cache memory is unnecessary and inefficient. Often, pages cached in the Storage Blade cache memory will not be used again and pages not cached in the Storage Blade will be accessed soon by the Processor Blade. If the Storage Blade relies only on its own cache memory staging/destaging algorithm, it may stage pages that will not likely be accessed, and destage pages that will likely be re-accessed.

By caching pages in Storage Blade cache memory that may not be accessed, cache memory is used unnecessarily. Because the cache memory is forced to stage and destage pages that may not have needed to be cached in the first place, system latency is increased. Furthermore, staging and destaging of pages requires power. Accordingly, each staging or destaging both uses electricity and generates heat. Additionally, storage of pages in cache requires power. Because many unnecessary pages are stored in cache in conventional Storage Blades, system power usage is increased.

Accordingly, a need exists in the art for a system and method that is capable of reducing duplication of data caching in Blade systems.

SUMMARY OF THE INVENTION

The present invention solves the above described problems by providing a method and apparatus for caching data in a blade computing complex. In one aspect, the invention provides a method for caching data in a blade computing complex. The blade computing complex includes a storage blade that includes a disk operative to store a plurality of pages of data and a cache memory operative to store at least one of the pages. The blade computing complex also includes a processor blade that includes a first memory area configured to store at least one of the pages and a second memory area configured to store an address of each of the pages and a hint value that is assigned to each of the pages. The address of each of the pages is stored in the second memory area.

A hint value is assigned to each of the pages, where the hint is one of likely to be accessed, may be accessed, and unlikely to be accessed. The hint value is determined by counting the number of accesses to each of the pages. A relative access value is then determined for each of the pages by comparing the number of accesses to each of the pages with the number of accesses to each other page. It is also determined whether a page fault has occurred and whether the faulted page is the least-recently-used page, and whether the page is pinned in the first memory area. A hint value is then assigned to the page based on at least one of the relative access value, the determination of whether a page fault has occurred and the faulted page is the least-recently-used page, and the determination of whether the page is pinned in the first memory area.

The hint value is then transmitted to the storage blade. The storage blade then reads the page associated with the hint value into storage blade cache memory. Before reading the page into cache memory, the storage blade determines whether the page is stored in cache memory. The storage blade reads the page into cache memory in response to determining that the page is not stored in cache memory and that the hint value is one of likely to be accessed and may be accessed. The storage blade removes the page from cache memory in response to determining that the page is stored in cache memory and that the hint value is unlikely to be accessed.

BRIEF DESCRIPTION OF THE DRAWINGS

FIG. 2 is a table that describes the hint generation for a categorized TLB entry according to an exemplary embodiment of the present invention.

FIG. 3 is a table that describes hint outcomes for particular TLB entries according to an exemplary embodiment of the present invention.

DETAILED DESCRIPTION

The present invention provides systems and methods by which a Processor Blade generates and transmits control signals, also referred to as "hints" or "hint values," to a Storage Blade to assist the Storage Blade in determining when to stage and destage pages that are stored on the Storage Blade. There may be three types of hints: "likely," "maybe," and "unlikely." The "likely" cache hint suggests that the Storage Blade should either stage or maintain a page not presently resident in Processor Blade memory because that page is likely to be accessed in the future. The "maybe" cache hint suggests that the Storage Blade should either stage or maintain a page in Storage Blade cache memory only if the page either 1) already exists in Storage Blade cache memory or 2) there is an open cache memory slot.

The "unlikely" cache hint suggests that the page is either not likely to be accessed by the Processor Blade, is pinned in Processor Blade memory, or is likely to be stored in Processor Blade memory, and will continue to be stored there. Upon receiving an unlikely cache hint, the Storage Blade should destage the page from Storage Blade cache memory.

The Processor Blade generates the likely, maybe, and unlikely hints in response to statistics on page utilizations that already exist in the virtual memory manager or translation tables of the Processor Blade.

Figure 1:
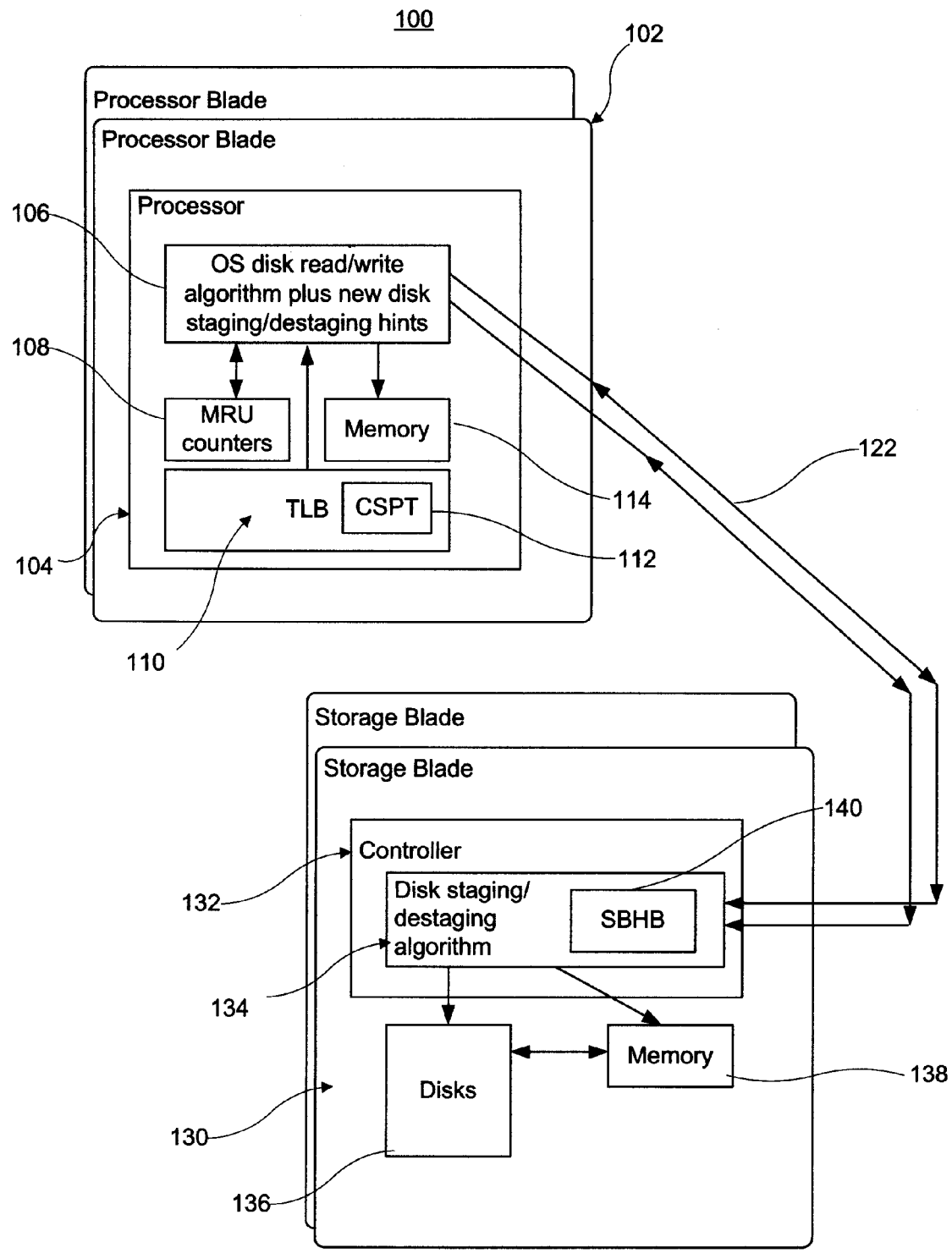
FIG. 1 is a system view of a Blade complex 100 according to an exemplary embodiment of the present invention.

Referring now to the figures, in which like numerals represent like elements throughout the figures, exemplary embodiments of the present invention will be described. FIG. 1 is a system view of a Blade complex 100 according to certain exemplary embodiments of the present invention. One or more Processor Blades 102 are connected to one or more Storage Blades 130 through via wires on a blade chassis backplane 120. The Processor Blade 102 has a processor 104 that is programmed to perform read/write algorithms, and also to establish hints that direct the staging operations of the Storage Blade 130. The processor 104 includes a Translation Lookaside Buffer (TLB) 110 that maintains translation tables for converting between real and virtual addressing. The Processor Blade 102 may also include a co-operative storage page table, or CSPT 112 that stores the last hint transmitted to a Storage Blade 130 for each page. The exemplary CSPT 112 may be stored as part of the TLB 110, but may be stored in other systems of the Processor Blade 102. The Processor Blade 102 also includes main memory 114. The processor 104 also contains one or more most-recently-used (MRU) counters 108 that are operative to count the accesses to each of a number of pages in the TLB 110.

The Storage Blade 130 contains a controller 132 programmed to stage and destage pages of information from disks 134 that provide storage for the Blade complex 100 to cache memory 138 that stores pages that may then be accessed by the Processor Blade 102. The cache memory 138 is used because it is much faster to access than a disk 136. A page stored on the disk 136 is said to be staged into cache memory 138 when it is copied from disk 136 into the cache memory 138. A page stored in the cache memory 138 is destaged when the page is moved from cache memory 138 to disk 136.

The Storage Blade contains a Storage Blade Hint Buffer 140 (SBHB) for each Processor Blade 102 that can send hints to the Storage Blade 130. The SBHB 140 contains the same number of entries as the processor TLB of its associated processor, and the TLB entry number is used to address into the SBHB 140 and place the hint and the physical disk page number into that entry of the SBHB 140. If multiple hints come into the SBHB 140 for the same entry before none can be processed, a prior hint is simply overwritten with the new hint.

Pages stored on the disk 136 are the same size as pages in stored in Processor Blade memory 114, but have a different physical address on disk storage than the virtual address used in the Processor Blade. In an exemplary embodiment, the virtual page in processor space can be mapped by the operating system to an actual page address on the disk 136 by programming the processor 104 to look up the virtual address in an external page table (XPT) (not shown) and obtain the physical disk address.

Hints are transmitted by the hint bus 122 from the Processor Blade 102 to the Storage Blade 130 along the backplane of the blade chassis. The data transmitted along the hint bus 122 includes, but is not limited to: a hint that suggests a staging or destaging course of action, the physical address of a page on the disk 136, and the index of the page as stored in the TLB 110.

The processor 104 categorizes TLB 110 entries depending on how often the page in the entry has been accessed in relation to other pages in the TLB 110 and assigns a category or relative access value to each page. In an exemplary embodiment, a TLB 110 entry might be categorized as highly accessed, or "high," if it is accessed often relative to other entries in the TLB 110. A TLB 110 entry might be categorized as moderately accessed, or "mid" if it is accessed a moderate amount compared to other entries in the TLB 110. A TLB 110 entry might be categorized as rarely accessed, or "low" if it not accessed as often as other TLB 110 entries.

In the exemplary embodiment, the frequency with which a particular page is accessed is determined by reading the access counts stored in the MRU counters 108. The MRU counters 108 track how often a page is accessed as program execution proceeds. The operating system (or other component of the Processor Blade 102), upon the occurrence of a triggering event, categorizes each TLB 110 entry based on the values generated by the MRU counters 108. The triggering event can be, for example, a page fault, a clock tick, or the occurrence of another interrupt, such as a process termination interrupt.

Table 1, below, provides exemplary pseudocode for one method of categorizing the TLB 110 entries based on the MRU count. In this example, the counts are compared to each other and to a threshold to specify its category.

TABLE 1

Categorization Pseudocode

```
#define THRESH_HIGH 200000000
#define THRESH_MID 100000000
#define THRESH_LOW 50000000
for each TLB entry i {
    is_High(i) = 1;
    is_Mid(i) = 1;
    is_Low(i) = 0;
    for all other TLB entries j {
        if (MRU_COUNT(i) - MRU_COUNT(j) < THRESH_
            HIGH) is_High(i) = 0;
        if (MRU_COUNT(i) - MRU_COUNT(j) < THRESH_
            MID) is_Mid(i) = 0;
    }
    if(is_High(i)) is_Mid(i) = 0;
    if(!is_High(i) &&!is_Mid(i)) is_Low(i) = 1;
}
```

The pseudocode shown in Table 1 provides a statically defined threshold. However, the threshold need not be static, and may be dynamically updated while the Processor Blade is running based on access counts, performance data, or any other information that may be relevant to categorization.

FIG. 2 presents a table 200 that describes the hint generation for a categorized TLB 110 entry, depending on the present state of the Processor Blade memory 114. The table 200 considers three exemplary states, although hint generation can be based on any number of appropriate states of the Processor Blade 102, Storage Blade 130, or Blade Complex 100.

In the first state 202, a page fault has occurred and the TLB 110 entry has become the least-recently-used (LRU) page. This tends to indicate that the page may be replaced in the near future. As shown in the table 200, if the TLB 110 entry has been categorized as high, (e.g., because the page has a high access count) the TLB 110 entry will be assigned a hint of likely to be accessed by the processor, or "likely." The TLB 110 entry is considered likely because this page has a high access count, and even though it is presently the least-recently used page, it will most likely be replaced next but will also be accessed again in the near future. If the TLB 110 entry is categorized as mid, it will be assigned a hint of may be accessed, or "maybe." If the TLB 110 entry is categorized as low, it will be assigned a hint of unlikely to be accessed, or "unlikely."

In the second state 204, the page represented by the TLB 110 entry is pinned in Processor Blade 102 memory 114. In this state 204, regardless of the TLB 110 entry's categorization, because the page is pinned in memory 114, it is unlikely that Storage Blade 130 will need to access the page on disk in the near future. A page may be pinned in Processor Blade 102 memory 114 for a variety of reasons. For example, if the page includes operating system code, or other code that is frequently executed or accessed, then to improve performance the page may be pinned in memory 114, thus alleviating any need to retrieve the page from storage having more latency, such as the disk 136. Accordingly, a pinned page is not likely to be accessed from the Storage Blade in the near future, and the appropriate hint is therefore unlikely.

In the third state 206, all other cases not handled by states 202 and 204 are handled. In an exemplary embodiment, if the page is not the LRU page and if it is categorized as high, it is likely already in Processor Blade 102 memory 114. Therefore the hint for the page is unlikely, because there is no reason to have the page duplicated in Processor Blade 102 memory 114 and Storage Blade 130 cache memory 138. Similarly, if the page is categorized as low, the Processor Blade 102 is unlikely to access it, and the Storage Blade 130 may destage the page from cache memory 138. If the page is categorized as mid, then the page may be accessed by the Processor Blade in 102 the near future. Accordingly, the hint is maybe.

FIG. 3 is a table 300 that describes TLB 110 entries for 4 pages and the corresponding co-operative storage page table entries for those pages. Table 300 illustrates that the TLB 110 may store an array of values that correspond to the last hint that was transmitted to the Storage Blade 130 for each page. The array may be referred to as the co-operative storage page table, or CSPT 112, which can be implemented either in hardware or in software, and is represented as the left-most column of FIG. 3.

The CSPT 112 provides the Processor Blade 102 a mechanism by which the Processor Blade 102 may avoid sending the same hint regarding the same page multiple times. For example, if a hint that has already been transmitted to storage is different from the new categorization and resulting hint found for the page (as described above), the new hint is written into the CSPT 112 and transmitted through the blade backplane to the Storage Blade 130. On the other hand, if the hint is the same as a prior hint sent for the page, the hint is not retransmitted.

After the hint is generated, transmitted to the Storage Blade 130 across the backplane, and stored in the storage blade hint buffer (SBHB), the Storage Blade 130 polls the SBHB 140 to determine if a hint is present. If a hint/disk page entry is present, the Storage Blade 130 may process the hint. In an exemplary embodiment, the processing of the hints is optional in the Storage Blade 130. Hint processing can be dropped in lieu of higher priority tasks that the Storage Blade 130 must execute. If the Storage Blade 130 processes the hint for a given page, it may respond differently depending on the hint.

For example, the Storage Blade 130 interprets the likely hint as a signal to stage the page or maintain the page in storage because the page is likely to be accessed again by the Processor Blade 102 in the near future. For example, as described above, when a page becomes the least-recently-used page and is being replaced, yet is categorized as high with respect to access counts, the page is likely to be accessed again by the Processor Blade 102 and should be stored in cache memory 138.

If a page hint is maybe, the Storage Blade 130 has the option as to whether to stage the page, depending on the current processing state of the Storage Blade 130. For example, the Storage Blade 130 may stage the page if the Storage Blade 130 has empty slots in its cache memory. The Storage Blade 130 may also consider other factors as to whether it will stage the page in cache memory 138. By way of example only, the Storage Blade 130 may consider: whether it has processor cycles available to stage in the page, whether the power dissipation in the Storage Blade 130 is low and therefore staging in another page will not contribute to high power dissipation, and/or whether there are empty slots in cache memory 138, or the percentage of slots being used is below a predetermined threshold. The threshold may be used to keep slots open for likely pages, and can be determined statically in advance, or reconfigured dynamically.

If a page hint is unlikely, it may include services that are known to be rarely accessed, or operating system or process pages that consistently show low access counts below a threshold and are categorized as such. Alternatively, a page may be unlikely because it is known to be pinned in the Processor Blade 102 memory 114. Accordingly, the Storage Blade interprets an unlikely hint as a signal to destage the page.

Figure 4:
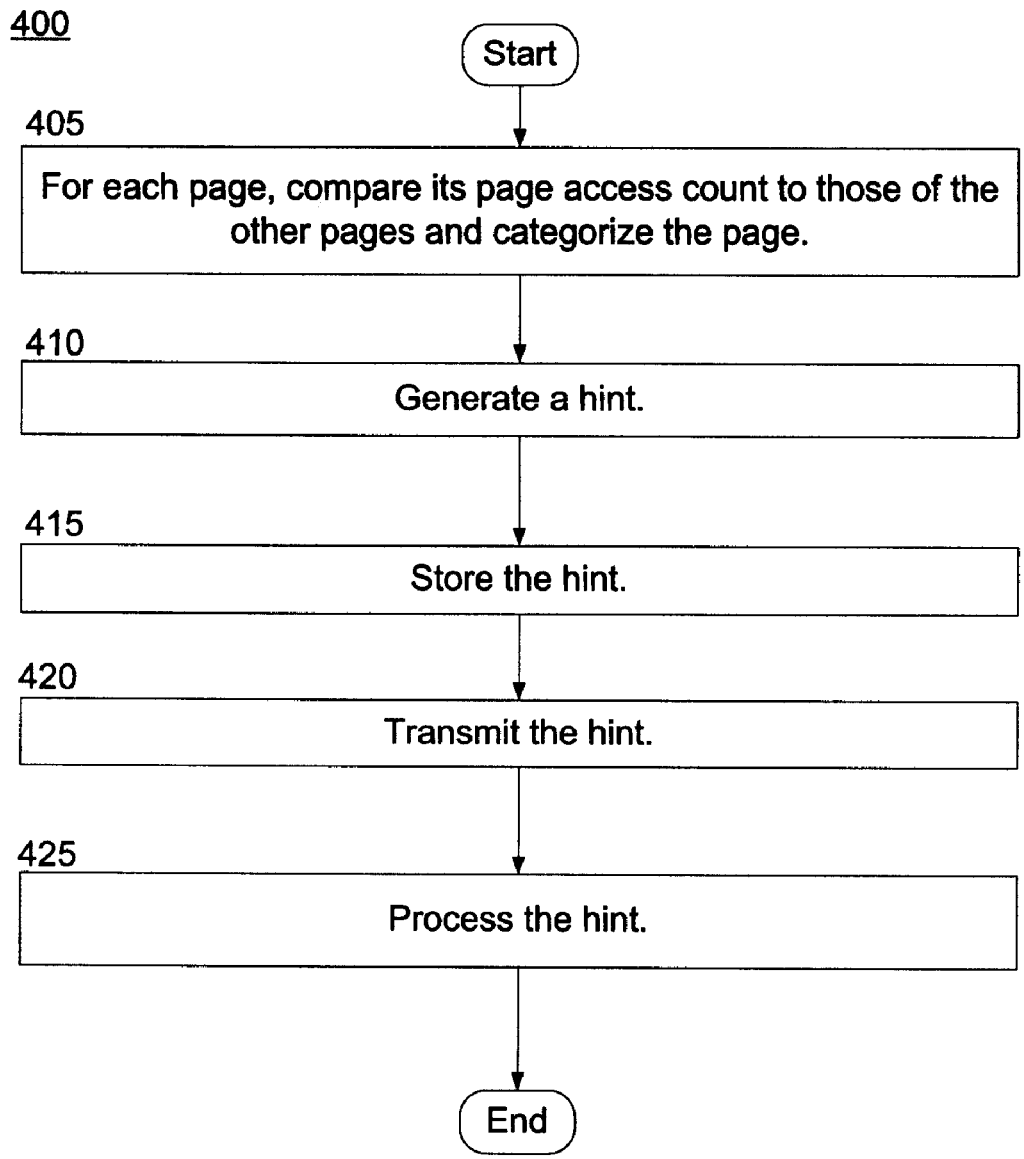
FIG. 4 is a logic flow diagram that illustrates a method for generating and processing hints according to an exemplary embodiment of the present invention.

FIG. 4 is a logic flow diagram that illustrates a method 400 for generating and processing hints according to an exemplary embodiment of the present invention. FIG. 4 will be discussed with reference to FIG. 1.

One of ordinary skill in the art will appreciate that process functions or steps performed by the Processor Blade 102 or the Storage Blade 130 may comprise firmware code executing on a microcontroller, microprocessor, or DSP processor; state machines implemented in application specific or programmable logic; or numerous other forms without departing from the spirit and scope of the invention. In other words, the invention may be provided as a computer program which may include a machine-readable medium having stored thereon instructions which may be used to program a computer (or other electronic devices) to perform a process according to the invention.

The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Certain steps in the processes or process flow described in all of the logic flow diagrams referred to below must naturally precede others for the invention to function as described. However, the invention is not limited to the order of the steps described if such order or sequence does not alter the functionality of the present invention. That is, it is recognized that some steps may be performed before, after, or in parallel other steps without departing from the scope and spirit of the present invention.

Additionally, it is recognized that certain steps could be re-arranged in different sequences or entirely deleted without deviating from the scope and spirit of the invention. In other words, it is recognized that the steps illustrated in the flow charts represent one way of achieving a desired result of reducing duplication in data caching. Other ways which may include additional, different steps or the elimination of steps, or the combination of eliminating steps and adding different steps will be apparent to one of ordinary skill in the art.

Further, one of ordinary skill in programming would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Referring again to FIG. 4, step 405 is the first step in the method 400. In step 405, for each page in the TLB 110, its MRU count is compared against the MRU count of other pages indexed in the TLB 110. The page is categorized as low, mid, or high as described with respect to FIG. 1.

In step 410, the Processor Blade 102 generates a hint based on the category in light of the state of the Processor Blade 102. In step 415, the hint is stored in the CSPT 112 array of the TLB 110. In step 420, the Processor Blade 102 transmits the hint to the Storage Blade 130, which receives the hint and stores it in the SBHB 140 for the Processor Blade 102 that sent the hint. In step 425, the Storage Blade 130 processes the hint and may stage or destage pages in cache memory 138 according to the hint.

Figure 5:
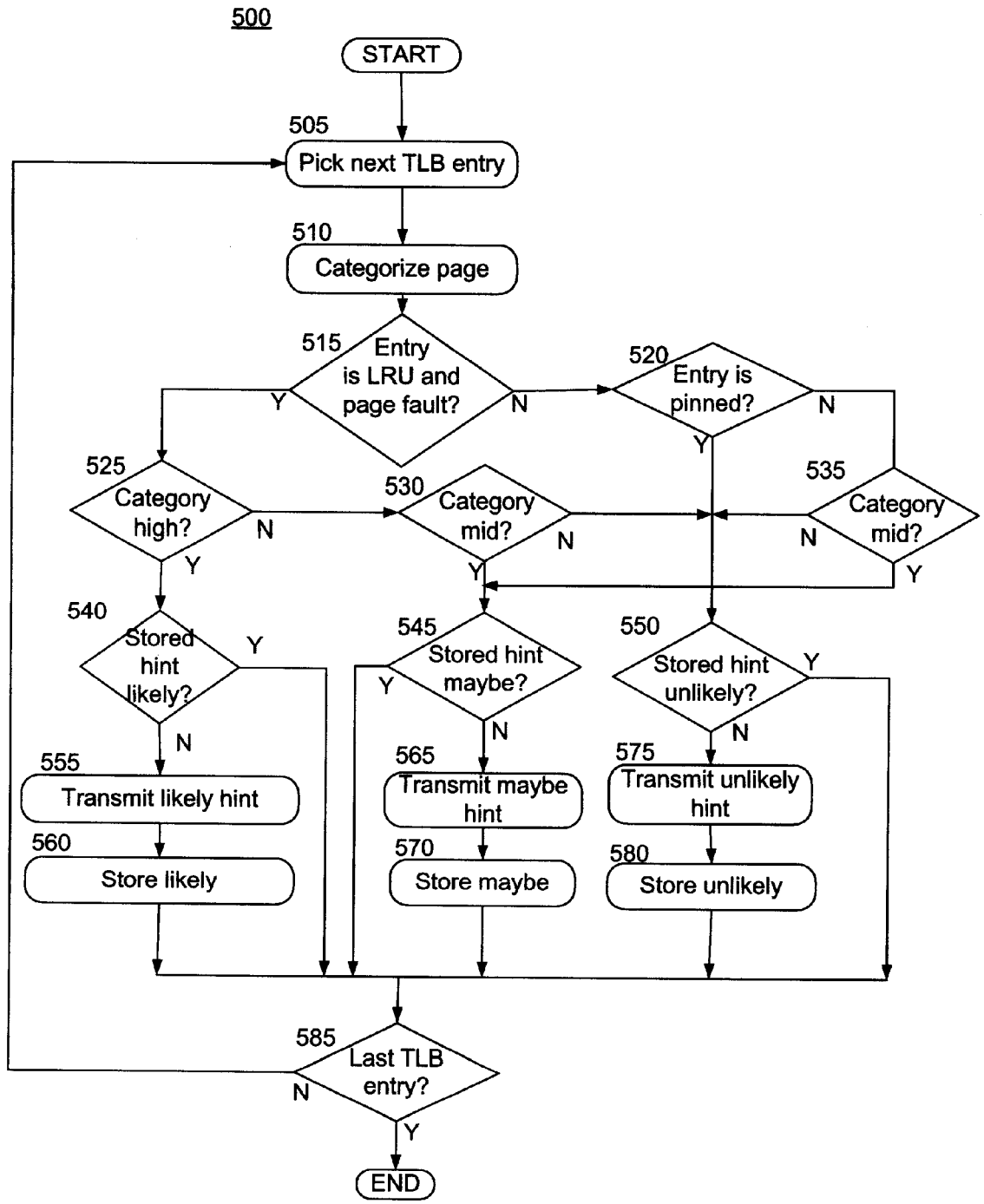
FIG. 5 is a logic flow diagram that illustrates the method of generating hints according to an exemplary embodiment of the present invention.

FIG. 5 is a logic flow diagram that illustrates the method 500 of generating hints according to an exemplary embodiment of the present invention. FIG. 5 will be discussed with reference to FIG. 1. In step 505, the Processor Blade picks the next TLB 110 entry, which may be the first TLB entry on the first pass through the process. In step 510, the MRU count of the TLB 110 entry chosen in step 505 is compared to the MRU count for the other TLB 110 entries. The TLB entry is categorized as high, mid, or low as described above.

In step 515, the Processor Blade 102 determines whether a page fault has occurred and the TLB 110 entry is the least-recently-used page. If the determination in step 515 is affirmative, the method 500 follows the "Y" branch to step 525, where it is determined whether the table entry has been categorized as high. If the determination in step 525 is affirmative, the method 500 follows the "Y" branch to step 540. In step 540, it is determined whether the hint stored in the CSPT 112 for the TLB 110 entry is likely. If the determination in step 540 is affirmative, the likely hint has already been transmitted to the Storage Blade 130, and there is no need to transmit the hint again. Accordingly, the method 500 follows the "Y" branch to step 585.

Referring again to step 540, if it is determined that the hint stored in the CSPT 112 for the TLB 110 entry is not likely, the method 500 follows the "N" branch to step 555, wherein the likely hint and the page information from the TLB 110 are transmitted to the Storage Blade 130. The method 500 then proceeds to step 560, wherein the likely hint is stored in the CSPT 112 for the TLB 110 entry. The method 500 then proceeds to step 585.

Referring again to step 525, if the determination is negative, the process 525 follows the "N" branch to step 530. In step 530, it is determined whether the TLB 110 entry is categorized as "mid." If the determination in step 530 is affirmative, the method 500 follows the "Y" branch to step 545. In step 545, it is determined whether the hint stored in the CSPT 112 for the TLB 110 entry is maybe. If the determination in step 545 is affirmative, the maybe hint has already been transmitted to the Storage Blade 130, and there is no need to transmit the hint again. Accordingly, the method 500 follows the "Y" branch to step 585.

Referring again to step 545, if it is determined that the hint stored in the CSPT 112 for the TLB 110 entry is not maybe the method 500 follows the "N" branch to step 565, wherein the maybe hint and the page information from the TLB 110 are transmitted to the Storage Blade 130. The method 500 then proceeds to step 560, wherein the maybe hint is stored in the CSPT 112 for the TLB 110 entry. The method 500 then proceeds to step 585.

Referring again to step 530, if the determination is negative, the process follows the "N" branch to step 550. In step 550, it is determined whether the hint stored in the CSPT 112 for the TLB 110 entry is unlikely. If the determination in step 550 is affirmative, the unlikely hint has already been transmitted to the Storage Blade 130, and there is no need to transmit the hint again. Accordingly, the method 500 follows the "Y" branch to step 585.

Referring again to step 550, if it is determined that the hint stored in the CSPT 112 for the TLB 110 entry is not unlikely the method 500 follows the "N" branch to step 575, wherein the unlikely hint and the page information from the TLB 110 are transmitted to the Storage Blade 130. The method 500 then proceeds to step 580, wherein the unlikely hint is stored in the CSPT 112 for the TLB 110 entry. The method 500 then proceeds to step 585.

Referring again to step 515, if the determination is negative, the method 500 follows the "N" branch to step 520. In step 520 it is determined whether the page referenced by the TLB 110 entry is pinned in Processor Blade 102 memory. If the determination is affirmative, the process follows the "Y" branch to step 550, wherein hint processing continues as described above.

Referring again to step 520, if the determination is negative, the method 500 follows the "N" branch to step 535. In step 535 it is determined whether the TLB entry 110 has been categorized as mid. If the determination in step 535 is affirmative, the method 500 follows the "Y" branch to step 545, wherein hint processing continues as described above. On the other hand, if the determination in step 535 is negative, the process follows the "N" branch to step 550, wherein hint processing continues as described above.

Once hint processing for the TLB 110 entry is complete, the method 500 proceeds to step 585. In step 585 it is determined if the TLB 110 entry is the last entry in the TLB. If the determination in step 585 is negative, the method 500 follows the "N" branch to step 505, wherein the next TLB 110 entry is chosen and the process continues. If, on the other hand, the determination in step 585 is affirmative, the method 500 follows the "Y" branch, and ends.

Figure 6:
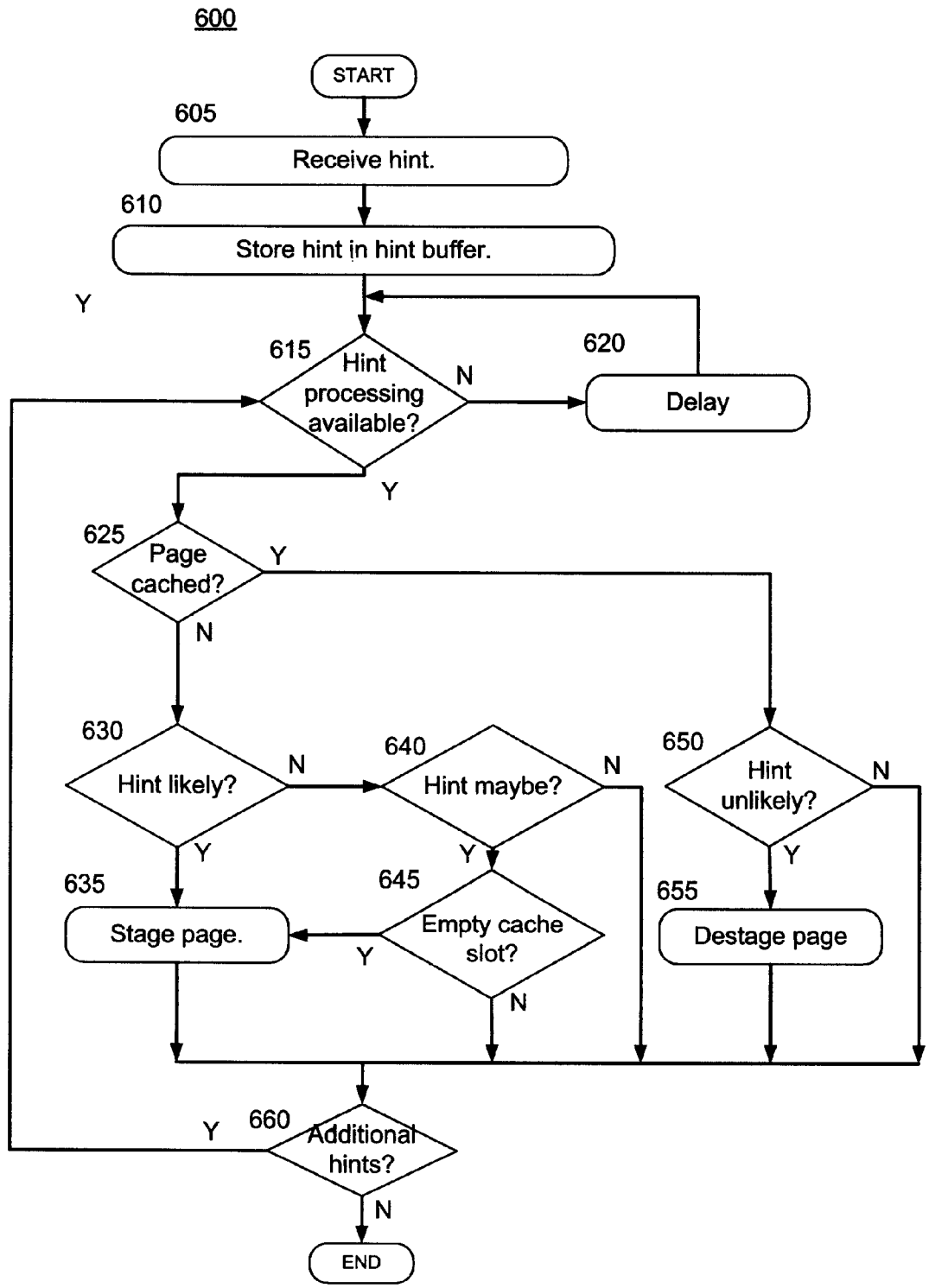
FIG. 6 is a logic flow diagram that illustrates a method of staging disk pages in response to hints according to an exemplary embodiment of the present invention.

FIG. 6 is a logic flow diagram that illustrates a method 600 of staging disk pages in response to hints according to an exemplary embodiment of the present invention. In step 605, a hint and TLB 110 entry information relating to a disk page arrives in the Storage Blade 130. In step 610, the hint and page information are stored in the SBHB 140. In step 615, it is determined whether the Storage Blade 130 can process the hint. If the determination in step 615 is negative, the method 600 follows the "N" branch to step 620, wherein the Storage Blade 130 delays hint processing. The method 600 then returns to step 615.

Referring back to step 615, if the determination is affirmative, the method 600 follows the "Y" branch to step 625. In step 625, it is determined whether the disk page associated with the hint is stored in Storage Blade 130 cache memory 138. If the determination in step 625 is negative, the method 600 follows the "N" branch to step 630, wherein it is determined if the hint is likely. If the determination in step 630 is affirmative, the method 600 follows the "Y" branch to step 635, wherein the page associated with the hint is stored in cache memory 138.

If, on the other hand, the determination in step 630 is negative, the method 600 follows the "N" branch to step 640. In step 640, it is determined if the hint is maybe. If the determination in step 640 is negative, the method 600 follows the "N" branch to step 660, thus completing processing for the particular hint. If, on the other hand, the determination in step 640 is affirmative, the method 600 follows the "Y" branch to step 645. In step 645 it is determined if a slot in cache memory 138 is available. If the determination in step 645 is affirmative, the method 600 follows the "Y" branch to step 635, wherein the page associated with the hint is staged in cache memory. If the determination in step 645 is negative, the method 600 follows the "N" branch to step 660, thus completing processing for the particular hint without staging the page associated with the hint in cache memory 138.

Referring back to step 625, if it is determined that the disk page associated with the hint is stored in cache memory 138, the method 600 follows the "Y" branch to step 650. In step 650, it is determined if the hint is unlikely. If the determination in step 650 is affirmative, the method 600 follows the "Y" branch to step 655, wherein the page associated with the hint is destaged from cache memory 138. On the other hand, if the determination in step 650 is negative, the method 600 branches to step 660, thus completing processing for the particular hint without destaging the associated page from cache memory 138.

In step 660, it is determined if any more hints are stored in the SBHB 140. If the determination in step 660 is affirmative, the method 600 follows the "Y" branch back to step 615, and the next hint is processed. On the other hand, if the determination in step 660 is negative, the method 600 follows the "N" branch, and ends.

Alternative embodiments of the co-operative main memory and storage blade cache will become apparent to one of ordinary skill in the art to which the present invention pertains without departing from its spirit and scope. Thus, although this invention has been described in exemplary form with a certain degree of particularity, it should be understood that the present disclosure has been made only by way of example and that numerous changes in the details of construction and the combination and arrangement of parts or steps may be resorted to without departing from the spirit or scope of the invention. Accordingly, the scope of the present invention is defined by the appended claims rather than the foregoing description.

What is claimed is:

1. A method for caching data in a blade computing complex comprising the steps of:
   providing a storage blade, comprising:
      a disk operative to store a plurality of pages of data; and
      a cache memory operative to store at least one of the pages;
   providing a processor blade, comprising:
      a first memory area configured to store at least one of the pages; and
      a second memory area configured to store an address of each of the pages and a hint value that is assigned to each of the pages;
   storing an address of each of the pages in the second memory area;
   assigning a hint value to each of the pages, the hint value comprising one of: likely to be accessed, may be accessed, and unlikely to be accessed, wherein assigning the hint value comprises the steps of:
      counting the number of accesses to each of the pages;
      determining, for each of the pages, a relative access value by comparing the number of accesses to each of the pages with the number of accesses to each other page;
      determining whether a page fault has occurred and the faulted page is the least-recently-used page;
      determining whether the page is pinned in the first memory area;
      assigning a hint value to the page, wherein the hint value is based on at least one of: the relative access value, the determination of whether a page fault has occurred and the faulted page is the least-recently-used page, and the determination of whether the page is pinned in the first memory area;
   transmitting the hint value to the storage blade; and
   storing the page associated with the hint value in the cache memory, wherein storing the page comprises the steps of:
      determining whether the page is stored in cache memory;
      storing the page in cache memory in response to determining that the page is not stored in cache memory and that the hint value is one of likely to be accessed and may be accessed; and
      removing the page from cache memory in response to determining that the page is stored in cache memory and that the hint value is unlikely to be accessed.

\* \* \* \* \*